(12) United States Patent
Nizam et al.

(10) Patent No.: US 12,353,810 B2
(45) Date of Patent: Jul. 8, 2025

(54) UNIFIED POWER FORMAT ANNOTATED RTL IMAGE RECOGNITION TO ACCELERATE LOW POWER VERIFICATION CONVERGENCE

(71) Applicant: Synopsys, Inc., Mountain View, CA (US)

(72) Inventors: Zamrath Nizam, Colombo (LK); Chirath Chamikara Diyagama, Colombo (LK); Bhaskar Pal, Cupertino, CA (US); Ashan Wickramasinghe, Colombo (LK)

(73) Assignee: Synopsys, Inc., Sunnyvale, CA (US)

( * ) Notice: Subject to any disclaimer, the term of this patent is extended or adjusted under 35 U.S.C. 154(b) by 569 days.

(21) Appl. No.: 17/868,325

(22) Filed: Jul. 19, 2022

(65) Prior Publication Data
US 2023/0043751 A1 Feb. 9, 2023

(30) Foreign Application Priority Data
Jul. 20, 2021 (IN) .............................. 202141032565

(51) Int. Cl.
*G06F 30/33* (2020.01)
*G06F 30/327* (2020.01)
(Continued)

(52) U.S. Cl.
CPC ............ *G06F 30/33* (2020.01); *G06F 30/327* (2020.01); *G06F 30/3323* (2020.01);
(Continued)

(58) Field of Classification Search
CPC .... G06F 30/33; G06F 30/327; G06F 30/3323; G06F 30/337; G06F 30/367; G06F 30/373; G06F 30/398
(Continued)

(56) References Cited

U.S. PATENT DOCUMENTS 8,214,782 B1 * 7/2012 Chakraborti ... G01R 31/318314
716/136
2002/0133792 A1 * 9/2002 Raghunathan .......... G06F 30/33
716/109

(Continued)

FOREIGN PATENT DOCUMENTS

CN 102592023 B * 6/2017
CN 104484885 B * 9/2017 ............. G06T 7/001
CN 112561084 A * 3/2021 ............. G06N 20/00

*Primary Examiner* — Phallaka Kik
(74) *Attorney, Agent, or Firm* — Andrew L. Dunlap; Haynes Beffel & Wolfeld LLP

(57) ABSTRACT

A method is provided. The method includes obtaining, for a particular integrated (IC) design, register transfer level (RTL) code and unified power format (UPF) settings, generating an RTL feature array from the RTL code, arranging features based on a UPF into a UPF feature array, generating, by a processor, a combined feature array for the particular IC design by combining the RTL feature array and the UPF feature array, comparing the combined feature array for the particular IC design with another combined feature array, and reporting differences, based on the comparing, between the combined feature array and the other combined feature array to identify changes in at least one of the RTL code and the UPF settings that resulted in a change in a number of power violations.

20 Claims, 5 Drawing Sheets

(51) Int. Cl.
*G06F 30/3323* (2020.01)
*G06F 30/337* (2020.01)
*G06F 30/367* (2020.01)
*G06F 30/373* (2020.01)
*G06F 30/398* (2020.01)

(52) U.S. Cl.
CPC .......... *G06F 30/337* (2020.01); *G06F 30/367* (2020.01); *G06F 30/373* (2020.01); *G06F 30/398* (2020.01)

(58) Field of Classification Search
USPC ..... 716/106, 109, 111, 133, 136; 703/14, 18
See application file for complete search history.

(56) References Cited

U.S. PATENT DOCUMENTS

| | | | |
|---|---|---|---|
| 2011/0218779 A1* | 9/2011 | Palisetti | G06F 1/3203 703/2 |
| 2012/0166168 A1* | 6/2012 | Srinivasan | G06F 30/327 703/14 |
| 2013/0019214 A1* | 1/2013 | Morimoto | G06F 30/327 716/101 |
| 2016/0019132 A1* | 1/2016 | Vilakkumadathil | G06F 11/3612 717/126 |
| 2017/0017744 A1* | 1/2017 | Swaminathan | H02J 3/00 |
| 2020/0042667 A1* | 2/2020 | Swaminathan | G06F 30/367 |
| 2021/0279392 A1* | 9/2021 | Banerjee | G06F 30/3315 |
| 2022/0138496 A1* | 5/2022 | Wang | G06F 30/33 382/159 |

* cited by examiner

UNIFIED POWER FORMAT ANNOTATED RTL IMAGE RECOGNITION TO ACCELERATE LOW POWER VERIFICATION CONVERGENCE

RELATED APPLICATION

This application claims priority to IN Provisional Application No. 202141032565, filed on 20 Jul. 2021 and titled UNIFIED POWER FORMAT ANNOTATED RTL IMAGE RECOGNITION TO ACCELERATE LOW POWER VERIFICATION CONVERGENCE, which is incorporated herein.

TECHNICAL FIELD

The present disclosure relates to electronic design automation (EDA). More specifically, the present disclosure relates to unified power format (UPF) annotated register transfer level (RTL) image recognition to accelerate low power verification.

BACKGROUND

Electronic design automation (EDA) includes static verification tools that can check functional components of an integrated circuit (IC) design to verify proper functionality. The static verification tools can identify violations in the IC design that result in improper functionality. A designer of the IC can review the violations and make changes to the IC design and then implement the static verification tools to re-check the functionality of the IC components.

SUMMARY

In an embodiment a method is provided. The method can include obtaining, for a particular integrated (IC) design, register transfer level (RTL) code and unified power format (UPF) settings, generating an RTL feature array from the RTL code, arranging features based on a UPF into a UPF feature array, generating, by a processor, a combined feature array for the particular IC design based on the RTL feature array and the UPF feature array, comparing the combined feature array for the particular IC design with another combined feature array, and reporting differences, based on the comparing, between the combined feature array and the other combined feature array to identify changes in at least one of the RTL code and the UPF settings that resulted in a change in a number of power violations.

In another embodiment the differences can be reported to a low power verification tool, and the method can further include, providing suggestions to an IC designer, via the low power verification tool, for modifying at least one of the UPF settings and the RTL code associated with the particular IC design to reduce the number of power violations.

In a further embodiment the suggestions can be provided in dependence on a trained machine learning model considering the reported differences and then providing the suggestions based on the reported differences.

In an embodiment the RTL feature array and the UPF feature array can correspond to a same RTL file associated with the particular IC design.

In another embodiment the RTL feature array can be generated from extracted RTL constructs that are extracted from the RTL code.

In a further embodiment the RTL feature array can be generated from the extracted RTL constructs by populating the RTL feature array with (i) identified first indexes associated with the RTL constructs and (ii) values assigned to the first indexes, such that there is a particular value assigned to each identified index.

In an embodiment the arranging of the features into the UPF feature array can include obtaining intermediate data that associates each UPF setting for components of the particular IC design with RTL objects, of the RTL code, identifying the components, obtaining UPF feature information related to the UPF settings, and combining the intermediate data and the UPF features to form the UPF feature array.

In another embodiment the obtained UPF feature information can be in an extensible markup language (XML) format, the RTL feature array can be in a comma separated value (CSV) format, the UPF feature array can be in the CSV format, the combined feature array can be in the CSV format and the intermediate data can be in a JavaScript Object Notation (JSON) format.

In a further embodiment the obtained feature information can include UPF feature information for each UPF setting identified by the intermated data.

In an embodiment the obtained UPF feature information can include UPF feature information for UPF settings selected from the UPF settings identified by the intermediate data.

In another embodiment the UPF settings can be selected by an IC designer.

In a further embodiment the UPF setting can be selected by a low power verification tool.

In an embodiment the UPF feature array can be populated with (i) identified feature indexes associated with UPF settings identified in the intermediate data and (ii) values assigned to the feature indexes, such that there is a particular value assigned to each identified feature index.

In another embodiment a value assigned to a specific feature index can correspond to a name of a particular UPF feature.

In a further embodiment a value assigned to a specific feature index can correspond to a value of a characteristic of a particular UPF feature.

In an embodiment the intermediate data can identify low power verification violations within the RTL code in association with UPF settings.

In another embodiment the combined feature array for the particular IC design can be populated with (i) identified feature indexes associated with both RTL constructs and UPF settings identified in intermediate data that associates each UPF setting for components of the particular IC design with RTL objects, of the RTL code, identifying the components and (ii) values assigned to the feature indexes, such that there is a particular value assigned to each identified feature index.

In a further embodiment a system is provided that can include a memory storing instructions, and a processor, coupled with the memory and to execute the instructions. The instructions when executed can cause the processor to perform operations including obtaining, for a particular integrated (IC) design, register transfer level (RTL) code and unified power format (UPF) settings, generating an RTL feature array from the RTL code, arranging features based on a UPF into a UPF feature array, generating, by a processor, a combined feature array for the particular IC design based on the RTL feature array and the UPF feature array, comparing the combined feature array for the particular IC design with another combined feature array, and reporting differences, based on the comparing, between the combined feature array and the other combined feature array to identify changes in at least one of the RTL code and the UPF settings that resulted in a change in a number of power violations.

In an embodiment operations can further comprise performing a set of modifications to at least one of the UPF settings and the RTL code, based on the comparing, to generate a modified IC design.

In a further embodiment, the operations can further include identifying behavior differences in two different releases of a low power verification tool by comparing differences between (i) the combined feature array generated, in part, from information provided by a one release of the low power verification tool and (ii) the other combined feature array generated, in part, from information provided by another release of the low power verification tool.

In an embodiment a non-transitory computer readable recording medium is provided. The non-transitory computer readable recording medium can include stored instructions. The instructions, which when executed on a processor, can cause the processor to perform operations including obtaining, for a particular integrated (IC) design, register transfer level (RTL) code and unified power format (UPF) settings, generating an RTL feature array from the RTL code, arranging features based on a UPF into a UPF feature array, generating, by a processor, a combined feature array for the particular IC design based on the RTL feature array and the UPF feature array, comparing the combined feature array for the particular IC design with another combined feature array, and reporting differences, based on the comparing, between the combined feature array and the other combined feature array to identify changes in at least one of the RTL code and the UPF settings that resulted in a change in a number of power violations.

In a further embodiment, the operations can further include training a machine learning model using the combined feature array and another combined feature array.

In another embodiment, the operations can further include implementing the trained machine learning model to provide suggestions to an IC designer for modifying at least one of the UPF settings and the RTL code associated with the particular IC design.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
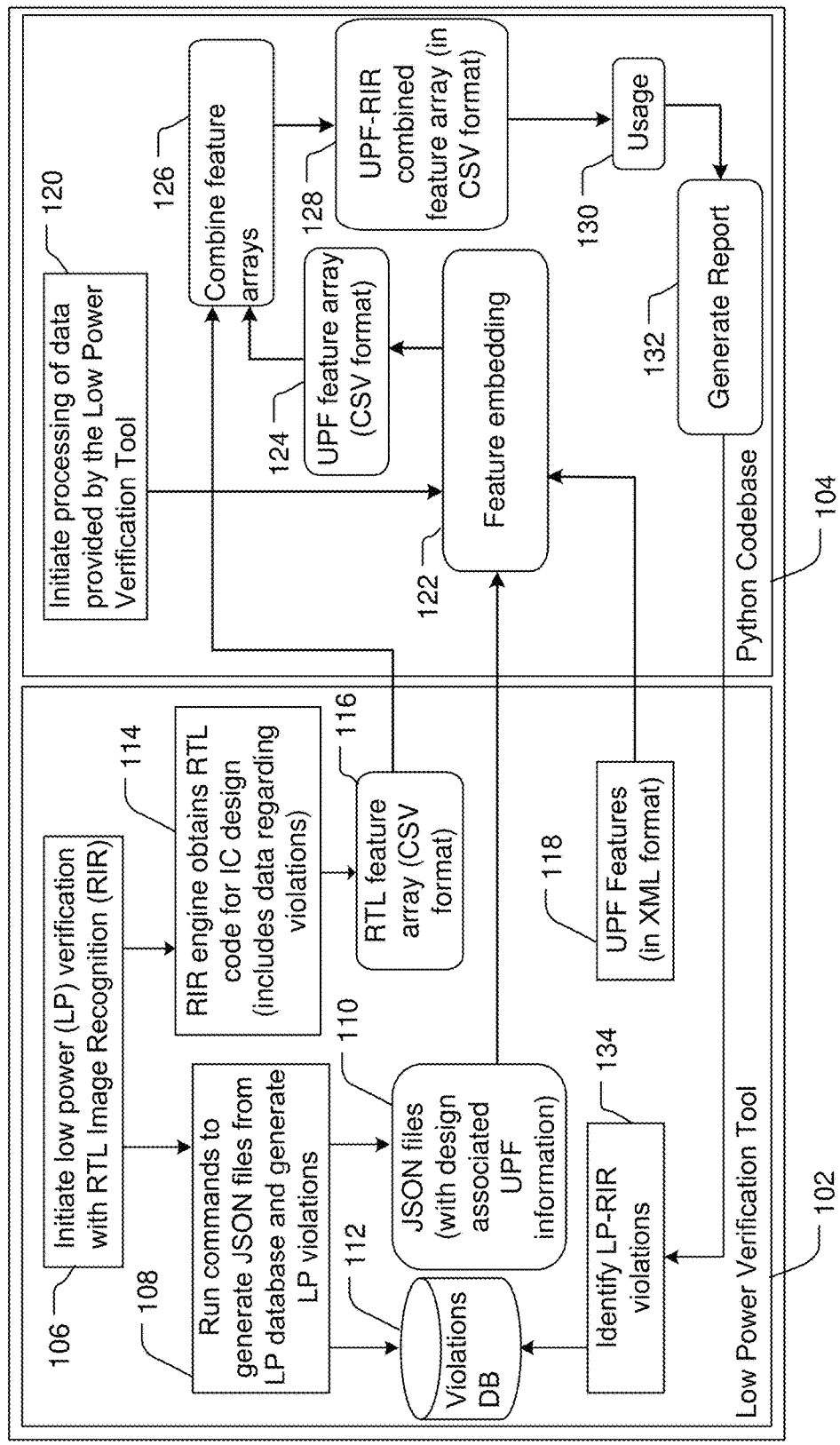
FIG. 1 is a flow diagram for a process of register transfer level (RTL) image recognition (RIR) and unified power format (UPF) feature generation, according to embodiments of the present disclosure.

A static low power verification system (e.g., VC LP™ provided by Synopsys®) can verify whether an integrated circuit (IC) is satisfying specific low power requirements (or low power intent) However, designers who use a low power verification system often find that flagged violations are related to incorrect unified power format (UPF) constraint settings. A UPF constraint setting can be a power requirement that should be satisfied by the IC when the low power verification is performed. If the UPF constraint setting is not satisfied, then information representing the IC (e.g., hardware description language (HDL) code) is flagged as a violation (e.g., a point at which a component is not behaving as expected). UPF settings (or UPF constraints) can be provided by the designer before performing the low power verification. However, the designer can incorrectly apply UPF settings (or constraints), which will cause a violation to be flagged. For example, a single incorrect UPF setting can result in a dramatic increase in violations during a subsequent low power verification. Further, for example, a static low power verification system can flag millions of violations. Such a large number of violations can make debugging of each violation very tedious. There can be violations which are dependent on single root causes, often resulting in a large number of violations that are tied so the same problem. This results in a designer unnecessarily checking many violations.

Furthermore, because violations are often related to incorrect unified power format (UPF) constraint settings, a need arises (i) to determine the accuracy of UPF settings and how they relate to violations and violation characteristics identified during low power verification of the IC device and (ii) consider register transfer level (RTL) properties at locations where the violations occur to determine the intrinsic nature of the violations.

Low power verification can verify power characteristics defined using UPF, associating power characteristics with design characteristics and alerting a designer about possible error scenarios and better usage. In other words, as described in more detail below, UPF files can define the (low) power intent for a given IC design. These files are provided additionally in correspondence the IC design. The low power verification tool can read both UPF and IC design files, interpret both function (specified by IC design files) and low power intent (specified by UPF) and annotate the low power intent in correspondence with the functional intent. This combined information can be stored in a low-power database internally. Intermediate JSON files can be generated by the tool containing this mapped information.

The present disclosure can address the above-described shortcomings by implementing electronic design automation (EDA) and unified power format (UPF) annotated register transfer level (RTL) image recognition to accelerate convergence of low power verification towards a desired goal. More specifically, the present disclosure can implement RTL image recognition (RIR) (or array generation) and UPF constraints to generate images or vectors (or arrays) from RTL code (also referred to as an RTL file). A combined feature image or vector (or array) can be generated from the images or vectors (or arrays) generated from the UPF constraints (or features) and the RTL code. The combined feature image or vector (or array) can be used to generate reports and identify ways to converge to a low power verification goal. Furthermore, these techniques may be used for improving low power verification, for assisting the vectorizing of the RTL code and UPF code, and utilizing data analytical tasks such as classification and clustering, etc. to improve design turnaround time.

There can be one or more RTL files that represent the functional intent of an IC design. The above-described images or vectors (or arrays) can be generated from RTL code that is within the one or more RTL files. UPF settings or constraints that represent the power intent of the IC for the low power verification of the IC can be stored in a different set of files.

The UPF standard, which is currently maintained by the Institute of Electrical and Electronics Engineers (IEEE), gives an IC device designer an opportunity to design electronic systems focused on circuit power early in the design process. UPF specifications allow for physical implementation-based power verification early in the design process at the RTL.

RTL code has a language syntax that is similar to tool control language (TCL) and has sufficient commands to define power intent (e.g., desired power consumption or other desired power related characteristics) for a circuit design, including elements, such as adding new power management related cells, adding a new power strategy, adding a new architecture definition, etc., and mapping the power management cells, the power strategy and the architecture definition to an RTL specification. These added elements and other definitions may be mapped to RTL specifications within UPF code or files.

Advantages of the present disclosure include, but are not limited to, improving the speed at which computer hardware can identify low power violations and converge on an IC design that satisfies UPF constraints. Specifically, some advantages can include identifying differences in RTL code and UPF settings between two version of an IC design and learning how violations change from incremental changes to the RTL code and the UPF settings and then further implementing the computer hardware to change the RTL code and the UPF settings to converge on the IC design that satisfies the UPF constraints. Further, some advantages include the ability to identify behavior differences in a release of a low power verification tool to identify accuracy and speed improvements of the lower power verification tool being executed on the computer hardware.

FIG. 1 is a flow diagram for a process of register transfer level (RTL) image recognition (RIR) and unified power format (UPF) feature generation.

At a high level, the present disclosure includes embedding each identified violation in terms of the pertinent RTL design and UPF constraints. Static violations can occur on objects identified in the RTL code (i.e., RTL objects) and on UPF constraints and the static violations can be distinguished from one another and flagged to the user (e.g., designer). Hence, the same RTL objects and UPF constraints, which are being used to flag violations, can be involved by using RTL testcases as described below and using the following high-level steps.

(1) obtain low power UPF information in a particular format, such as a JavaScript Object Notation (i.e., JSON) format, for an IC design. JSON is a standard text-based format for representing structured data based on JavaScript object syntax. (2) generate a UPF feature array by converting the UPF information that is in JSON format to another particular format, such as a comma-separated values (CSV) format, that incorporates additional UPF features, such as static definitions of UPF settings that relate to the IC design. (3) generate an RTL feature array in a particular format, such as CVS format, using an RIR engine that obtains RTL code for the IC design. (4) Combine the RTL feature array and the UPF feature array to obtain a UPF-RIR combined feature array. A UPF feature array is an array of data that identifies various UPF features, along with, for each UPF feature, a respective feature index and a respective value of the UPF feature. An RTL feature array is an array of data that identified various RTL object (e.g., objects of an IC described in RTL code), along with, for each RTL object, a respective index and a respective value of the RTL object. A UPF-RIR combined feature array is an array of data that combines the RTL feature array and the UPF feature array. These steps are described in more detail below with reference to FIG. 1.

Specifically, FIG. 1 illustrates a portion 102 of process 100 that is performed by a low power verification tool, such as a static low power verification system (e.g., VC LP™). High-level steps (1) and (3) from above can be performed by the low power verification tool. Anther portion 104 of the process 100 can be performed using another type of platform that uses, for example, a python codebase.

At operation 106 the low power verification tool can initiate a low power (LP) verification of an IC using RTL Image Recognition (RIR). RIR is a technique to represent RTL code in a pixel space (e.g., as an image) and/or as a vector/array, based on RTL constructs extracted from RTL code. The LP verification can be initiated by issuing, for example, an analysis command, such as enable_rir_upf_analysis (this is just an example command name) The process 100 can further include an operation 120 of initiating the processing of data provided by the low power verification tool (e.g., initiating the embedding of UPF features and IC design associated UPF information using JSON, CSV and XML files generated by performing operation 106). Operation 120 can be initiated by issuing an embedding command, such as execute_rir_embedding command, that will begin the process of embedding IC design associated UPF information into a feature array referencing the UPF features given, which is described in more detail below with reference to reference elements 110, 118 and 122.

The analysis command, such as the enable_rir_upf_analysis command can be used to enable RIR and UPF information extraction, and can be applied before a check_lp command (e.g., a command in VC LP that is used to invoke low-power violation checks) or a check_lint command (e.g., a command that is used to invoke a lint checker in a VC static tool). The embedding command, such as the execute_rir_embedding command can be used to invoke a python engine to perform processing of the RTL feature array, the JSON files and UPF features related to the IC design, as obtained from the low power verification tool 102. The embedding command can be invoked after the IC design is loaded by the low power verification tool 102. In some implementations, no other input is needed.

In operation 108 the low power verification tool can run commands to generate JSON files from a LP database and generate LP violations. In operation 110 the JSON files can be stored to include or along with UPF information (e.g., UPF settings) related to the IC design, as well as additional information that associates specific power intent for each IC component or object. The JSON files can be referred to as intermediate JSON files. The UPF settings and associations can be used in a subsequent operation to generate a UPF feature array. For example, UPF features for some or all of the UPF settings identified in the IC design can get identified and then eventually embedded into an UPF feature array (discussed in further detail below). Additionally, the LP violations generated in operation 108 can be stored in a violations database (DB) 112.

In operation 114, an RIR engine of the low power verification tool can obtain RTL code for the IC design. The RTL code can include data regarding low power violations. In operation 116 an RTL feature array is generated from the RTL code. The RTL feature array can be in a particular format, such as a CSV format. The RTL feature array can also be referred to as an RTL image or RTL images. The RTL feature array is described in more detail below.

In operation 118, the low power verification tool can select UPF features that are related to the IC design. The UPF features can be provided in a particular format, such as extensible markup language (XML). The selected UPF features can include static definitions of UPF settings that the IC designer or the low power verification tool is interested in. UPF features can be provided (selected) for all UPF settings, which are identified in the intermediate JSON files. Alternatively, the UPF features can be provided (selected) for select UPF settings (e.g., selected by the user or suggested and/or selected by the system), which are identified in the intermediate JSON files.

Once the intermediate JSON files, the RTL feature array and the UPF features are generated, operation 120 can initiate the processing (e.g., the embedding) of the JSON files, the RTL feature array and the UPF features to generate feature arrays. Specifically, operation 120 can initiate the feature embedding operation 120, which utilizes the intermediate JSON files and the UPF features to generate a UPF feature array 124. The UPF feature array 124 is a combination of UPF features for some or all of the UPF settings identified in the IC design. In other words, the information obtained in operation 110 is combined (e.g., embedded) with the UPF features of the UPF settings identified in the IC design. A more detailed example of (i) UPF features is described below with respect to Table II (Example UPF features) and (ii) the UPF feature array 124 is described below with respect to Table III (Example UPF Feature Array). The UPF feature array 124 can be in a particular format, such as the CSV format.

Operation 126 combines the RTL feature array 116 and the UPF feature array 124 to generate a UPF-RIR combined feature array 128 in a particular format, such as the CSV format. A more detailed example of the RTL feature array 116 is provided below with respect to Table I (Example RTL feature array). The data from the RTL feature array 116 is combined with the UPF feature array 124 generated by the feature embedding 122 to generate a new feature array, as the UPF-RIR combined feature array 128, which is described in more detail below with respect to Table IV (Example Combined Feature Array). The UPF-RIR combined feature array 128 can be used 130 in many ways, which are described in detail below in the "Applications" section of this document. One of the ways in which the UPF-RIR combined feature array 128 can be used is to generate a report 132 which can be used by the low power verification tool to identify LP-RIR violations in operation 134, which can be stored in the violations DB 112. The identified LP-RIR violations can provide new insights and information regarding LP violations. The report 132 can be used to assist in debugging low power violations, provide low power violation clustering details and include statistics regarding UPF and RTL design and details.

To achieve data extraction, exploration, and visualization, RTL code for a particular IC design can be represented in vectorized format (e.g., as an RTL array or an RTL image). This process of generating an RTL array or an RTL image can also be referred to as RTL embedding. A relative position can be defined for every construct pattern within the RTL code so that RTL arrays (or RTL images) can be compared to identify differences or changes in the IC design. The RTL (feature) array can be generated by extracting RTL constructs from the RTL code associated with the IC design.

For example, RTL constructs can be extracted from respective scope locations using an object model (OM), which describes a mechanism by which objects are handled in programming architecture, to represent RTL types. An example OM can include about 300 RTL objects. In other words, there are about 300 index values, each being associated with a particular RTL construct. The indexes that correspond to the RTL constructs can be identified using an index list that, for example, identifies the 300 RTL objects mentioned above. Further, for example, if 'module' construct is represented using an enumerated (enum) value 4, and if an array having a length of 300 is created (from the 300 RTL objects), then the 'module' construct can be represented using index 4 in that array. The enumerated value can be chosen (e.g., arbitrarily) in a manner that is consistent between generated arrays. The example RTL code below and Table I illustrate an example of RTL embedding, as discussed above.

The example code is:

```
module m(input in, clk, output reg out);
    always (@posedge clk) begin
        out <= in;        //←(A)
    end
endmodule
```

TABLE I (Example RTL Feature Array)

| | | | Module | | Port | | Always | | Named object 'out' | |
|---|---|---|---|---|---|---|---|---|---|---|
| Index | 0 | 1 ... | 4 | ... | 17 | ... | 48 | ... | 68 | ... |
| Value | 0 | 0 ... | 1 | ... | 1 | ... | 1 | ... | 1 | ... |

As illustrated in Table 1, in the RTL array, the module construct has an index of 4 (e.g., 4 is a relative position of the specific "module construct" in the RTL array). The RTL array also includes other constructs such as port, always, named object out. As mentioned above, the RTL feature array can be generated and stored in a CSV format. From this example "module m" (actually just "module") is a construct associated with the index value 4 from the example RTL code, "input in" and "output reg out" (actually referred to as "port") is a construct associated with the index value 17, the named object use is referred to as "out" is a construct associated with the index value 68, "always" is a construct associated with the index value 48, "@posedge clk" (actually just "posedge") is a construct associated with the index value 105, and "out<=in" is a construct associated with the index value 97. A person of ordinary skill in the art will recognize the various constructs included in the example RTL code and will understand the indexes associated therewith. These index values are only examples and other index value schemes can be implemented.

From the example RTL code provided above, an object path of interest may be identified. The object path of interest represents the perspective from which a first (object path) array can be generated. In this example, the object path of interest will be from the perspective of the RTL code line marked as "(A)" which is essentially the output of the RTL code. This example object path of interest includes "module," "always," "out" and "out<=in". Other examples of different object paths of interest could include the path to the sensitivity list of the always block (i.e., "@posedge clk"). Once the object path of interest is determined, depths can be assigned to the various constructs in accordance to the scope of each construct starting from the Root of the RTL code to the end of the RTL code according to the identified object path. RTL codes (like most of the other programming languages) define the scope for each object to avoid object collisions (i.e., any object defined in a local scope (say within a function), only refers within the scope boundary (function boundary)). This is similarly applied for all the objects in the RTL code. Most of the compilers/synthesizers in the EDA domain use this scoping and can be used in RIR technology, as understood by a person of ordinary skill in the art. For example, using the RTL code described above, root has a depth of 0, module has a depth of 1, always has a depth of 2 (as ports and the always block are just inside the module boundary), @posedge has a depth of 3 (as this is inside the always block), out<=in has a depth of 3 (again @posedge and out<=in are in the same scope, which is inside the always block), and out has a depth of 4 (as it is inside the out<=in scope).

Table II illustrates various UPF features that can be selected in operation 118. A UPF feature can be any feature of the IC design that is related to the UPF standard (e.g., specifying power intent for power optimization of an IC design, such as power supplies, power control, etc.), as described above. Examples of UPF features are provided in Table II below. Some examples include (i) related_power_net, which depicts an RTL object's association with a UPF power net (e.g., a power net or network defined in a UPF file using commands, such as "create_supply_net"), and (ii) iso_sink, which depicts an RTL object's association with an isolation sink (e.g. a load of an isolation device for which the isolation strategy is written in UPF).

Specifically, the UPF features (also referred to as UPF feature information) in Table II can be selected based on their association with RTL objects included in the RTL code that represents a particular IC design. A short description of these features and their possible values are also shown in Table II. As illustrated in Table 2, each UPF object (e.g., $UPF_1$) includes a feature name, a description and possible values.

TABLE II (Example UPF Features)

| | Feature name | Description | Possible values |
|---|---|---|---|
| $UPF_1$ | related_power_net | 'related-power-net' attribute associated with design port | supply_port_name |
| $UPF_2$ | related_ground_net | 'related-ground-net' attribute associated with design port | supply_port_name |
| $UPF_3$ | receiver_supply | 'receiver-supply' attribute associated with design port | supply_set_reference_name |
| $UPF_4$ | driver_supply | 'driver-supply' attribute associated with design port | supply_set_reference_name |
| $UPF_5$ | repeater_supply | 'repeater-supply' attribute associated with design port | supply_set_reference_name |
| $UPF_6$ | feedthrough | Indicating whether 'feedthrough' attribute is associated with the design port | 0, 1 |
| $UPF_7$ | clamp_value | clamp-value attribute associated with design port with −1 indicating value not specified and 2 indicating value as latch | −1, 0, 1, 2 |
| $UPF_8$ | related_supply_default_primary | Indicating whether 'related-supply-default-primary' attribute is associated with the design port | 0, 1 |
| $UPF_9$ | is_unconnected | Indicating whether 'unconnected' attribute is associated with the design port | 0, 1 |
| $UPF_{10}$ | is_analog | Indicating whether 'analog' attribute is associated with the design port | 0, 1 |
| $UPF_{11}$ | iso_src | Indicating whether the design element is an isolation source | 0, 1 |
| $UPF_{12}$ | iso_sink | Indicating whether the design element is an isolation sink | 0, 1 |
| $UPF_{13}$ | retention_reg | Indicating whether the design element is set as a retention register | 0, 1 |

TABLE II-continued (Example UPF Features)

| Feature name | | Description | Possible values |
|---|---|---|---|
| $UPF_{14}$ | retention_reg_no_ret | Indicating whether the design element is set as a retention register with '-no_retention' attribute | 0, 1 |
| $UPF_{15}$ | psw_control_pin | Indicating whether the design element is a power-switch control pin | 0, 1 |

There are other UPF specific objects that can be represented as features. UPF objects are devices and other definitions introduced in UPF for power maintenance purposes and may have no direct correlation with initial RTL design. Power Switches may be an example of UPF specific objects. These may be represented with their name and attributes encoded in binary format and then may be included in the selected UPF feature. In addition to features like 'related_power_net' mentioned in Table II, some UPF features like "power domain" have names as values. Other UPF features can have values that correspond to adjustable characteristics of the UPF feature. These can be represented as values and embedded in a UPF feature array. Specifically, all of the selected UPF features can be arranged into a UPF feature array, which is similar to the RTL feature array. Table III provided below illustrates the UPF feature array that is generated using the selected UPF features and the intermediate JSON files (this can be done in the feature embedding operation 122 of FIG. 1). The order of arranging data in the UPF feature array should be consistent between different UPF feature arrays that are used (an IC design can have multiple UPF files and each file can be used to generate a UPF feature array, where each of the individual UPF feature arrays generated from the multiple UPF files can be combined form one UPF feature array). For example, data can be arranging in alphabetical order with respect to the UPF feature name. The feature index represents an index number associated with a particular UPF feature and the feature values come from the selected UPF features (Table II).

TABLE III (Example UPF Feature Array)

| | UPF1 | UPF2 | UPF3 | UPF4 | UPF5 | ... | UPFM |
|---|---|---|---|---|---|---|---|
| Feature index | 0 | 1 | 2 | 3 | 4 | ... | M − 1 |
| Feature values | 0 | 1 | 0 | 2 | 8 | ... | 1 |

The low power verification tool can obtain UPF files from an LP database. The UPF files are related to the IC design. UPF files (code) are used to specify power related information of an IC design and RTL code specifies the functional design. Similar to how RTL code is written by a designer using a verification tool (using an HDL language like Verilog), low power characteristics as written in UPF according to a specific IEEE standard. The UPF files can be read by the verification tool after the RTL files (code), then the specifications in the UPF file are mapped to design elements in the RTL files. This combined information can be stored in a low-power database. The obtained UPF files can then be used to generate the intermediate JSON files, wherein the intermediate JSON files can be generated using the mapping information that is stored in the low-power database. The low power verification tool can also be used to map RTL objects from the RTL code with UPF information from the UPF files. The intermediate JSON files include UPF settings and associations to RTL objects. For example, the intermediate JSON files can include RTL related information (information about RTL objects from the RTL code), such as a file name and line number of RTL objects that are mapped to the UPF information (e.g., UPF settings), along with other information (e.g., information obtained from UPF files and that is associated with the RTL code, such as related name mappings), such that each RTL object will have a file name and line number associate therewith.

The UPF feature array, as discussed above, is generated by performing a feature embedding operation 122 using the UPF features and the intermediate JSON files. Specifically, the intermediate JSON files identify the UPF settings and associations which can be combined with the selected UPF features in the UPF feature array (e.g., the selected UPF features are prior definitions of what to do when the system encounters some information from a UPF file, which are now in the intermediate JSON files). The UPF feature array can generated using a Python engine (Python codebase). The UPF features, which are included in the UPF feature array, can be associated with RTL objects and then combined with the RTL feature array, which can be in CSV format, in operation 126.

Portions of the generated RTL feature array and the UPF feature array can corresponding to the same RTL code (or RTL file) and line numbers of the RTL code (referred to as an RTL line or RTL lines) can be combined together to make a combined feature array (e.g., UPF-RIR combined feature array) for each relevant RTL file name and line number combination. For example, RTL and UPF feature arrays can be compared to determine whether the RTL and UPF feature arrays identify similar locations (with respect to file names and line numbers).

Some RTL lines may not have a corresponding UPF feature array. Such lines may have an extended 0 series in the combined feature array. The combined feature array can be generated and stored in CSV format.

The generation of the combined final feature array can be extended to consider and potentially include RTL object names. An example is illustrated in Table IV (with reference to Tables I, II, and III), for each RTL object.

TABLE IV (Example Combined Feature Array)

| | RIR1 | RIR2 | ... | RIRN | UPF1 | ... | UPFM |
|---|---|---|---|---|---|---|---|
| Feature index | 0 | 1 | ... | N − 1 | N | ... | N + M − 1 |
| Feature values | 1 | 0 | ... | 1 | 2 | ... | 1 |

Referring to Table IV, the combined feature array can include each RTL object (e.g., $RIR_1$), a corresponding feature index and a feature value and can include each UPF object (e.g., $UPF_1$), a corresponding feature index and a feature value. For example, assume that the combined feature array can have 'n' number of entries equal to the number of features. Hence, the first unit testcase may be represented using the combined feature array, $x^{(1)}=[x_1 \ x_2 \ldots x_n]^T$. A testcase is created to indicate an IC design scenario. Further this can be labeled using a unit testcase name, $y^{(1)}$. Likewise, the $i^{th}$ unit testcase may be represented as follows.

$$x^{(i)}=[x_1 x_2 \ldots x_n]^T \text{ with label } y^{(i)}$$

This provides a complete unit testcase set as, $\{(x^{(1)}, y^{(1)}), (x^{(2)}, y^{(2)}), \ldots, (x^{(m)}, y^{(m)})\}$, which represents a vector of combined feature arrays, one for each testcase. This results in a training set which can be used to train a machine learning model that can be implemented to provide suggestions to the IC designer.

Figure 2:
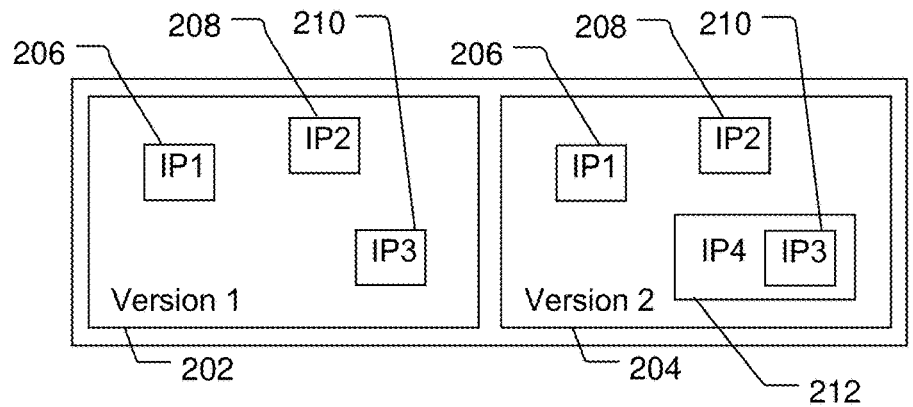
FIG. 2 illustrates a use-case scenario where intellectual property (IP) semiconductor cores and/or IP blocks are identified using a combined RIR-UPF feature array, according to embodiments of the present disclosure.

FIG. 2 illustrates a use-case scenario 200 where intellectual property (IP) semiconductor cores and/or IP blocks are identified using a combined RIR-UPF feature array, according to embodiments. For example, as illustrated in FIG. 2, there are two versions of a design (i.e., version 1 202 and version 2 204) that are each made up from IPs characterized from RTL code and UPF settings. Version 1 202 includes IP1 206, IP2 208 and IP3 210 and version 2 204 includes IP1 206, IP2 208, IP3 210 and IP4 212. For each IP, combined RIR and UPF feature arrays can be calculated using the techniques described above. By comparing a combined feature array of one IP against another combined feature array of another IP, the same IPs can be identified even if their scopes are changed. "Scope" refers to the 'hierarchy order' of RTL objects. For example, in FIG. 2, IP3 210 is in the top module (e.g., a block of RTL code that implements a certain functionality) in version 1 202, but IP3 210 is in IP4 212 in version 2 204. In other words, the combined feature array for version 1 202 can be compared to the combined feature array for version 2 204 to identify the differences with respect to IP3 210 and IP4 212. This comparison can be used to see how the combined feature array for version 2 204 is different from the combined feature array for version 1 202. These differences identify the differences between version 1 202 of IP3 210 and version 2 204 of IP3 210, as well as IP4 212. There are many different ways to use the combined feature arrays. Some particular implementations of the combined feature arrays are discussed below.

The above-described techniques can be implemented in several different way to improve low power verification of IC designs.

Figure 3:
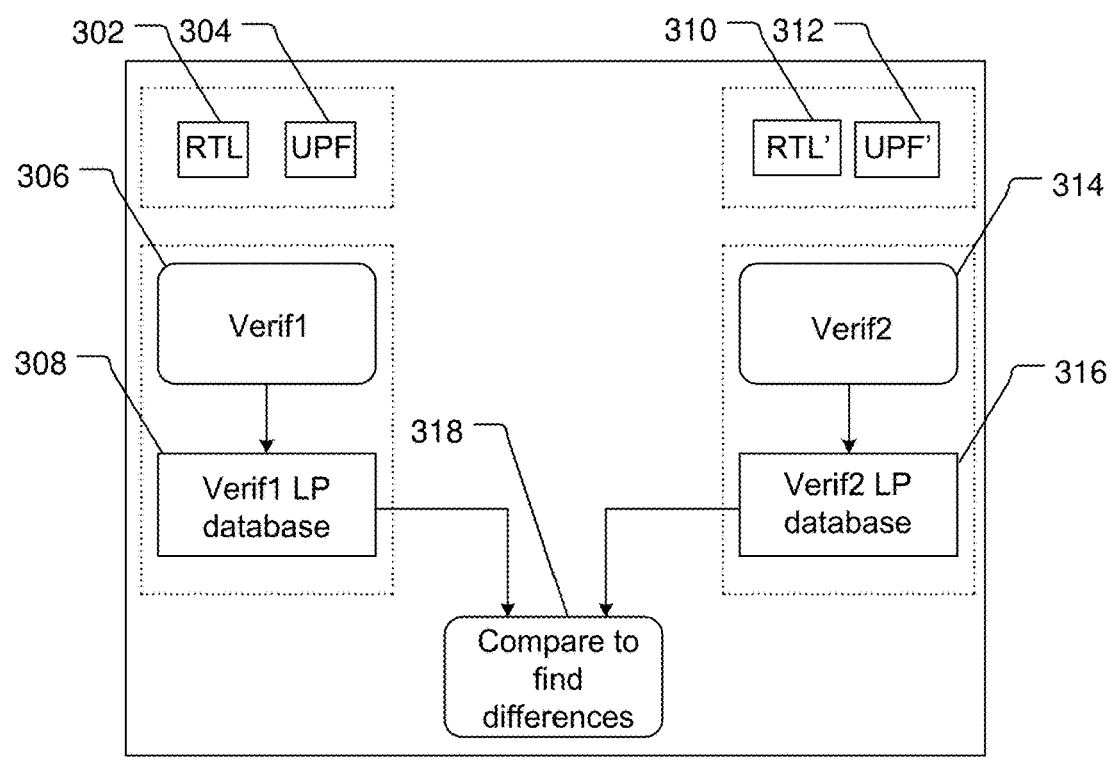
FIG. 3 illustrates comparing databases that are each based on different RIR and UPF feature arrays, according to embodiments of the present disclosure.

FIG. 3 illustrates a way to improve lower power verification of IC designs by implementing a process 300 of comparing databases that are each based on different combined RIR and UPF feature arrays, according to embodiments of the present disclosure. Specifically, a problem that can be addressed by FIG. 3 involves the following steps: (1) analysis of verification results 'Verif1' on version N of a IC design (with UPF settings, version M); (2): perform a set of modifications on the IC design and/or UPF settings leading to version N+1 of the IC design and M+1 of the UPF settings; (3) analysis of verification results 'Verif2' on the new version (version N+1 of the IC design and M+1 of the UPF settings) pointing to potential bad modification (e.g., unexpected results) of the IC design and/or the UPF settings.

FIG. 3 illustrates performing a root-cause analysis and converging on the unexpected results in 'Verif2'. Specifically, FIG. 3 illustrates that RTL code 302 (version N) and UPF settings 304 (version M) are used for a low power verification to obtain verification results verif1 306. The verification results verif1 306 are stored in a database 308 (verif1 LP database) along with combined RIR-UPF feature arrays. Further, RTL' code 310 (version N+1, which can be different from RTL code 302) and UPF' settings 312 (version M, which can be different from UPF settings 304) are used for a low power verification to obtain verification results verif2 312. The verification results verif2 314 are stored in a database 316 (verif2 LP database) along with combined RIR-UPF feature arrays. The verification results verif1 306 and the verification results verif2 314 can be stored as separate results in a same database rather than being saved in separate databases. Next, in operation 318 differences between the RIR-UPF feature arrays stored in the verif1 LP database 308 and the RIR-UPF feature arrays stored in the verif2 LP database 316 are identified. The identified differences can be used to identify how violations change from incremental changes to the RTL code and the UPF settings. This described process can be carried out for several verifications runs and data can be collected and compared. Further, the data collected can be used to train a model to predict behavior of violations with the incremental changes and then the model can suggest UPF setting modifications and RTL code changes. The differences obtained in operation 318 can be reported to the low power verification tool and the low power verification tool can provide suggestions to the IC designer for modifying at least one of the UPF settings and the RTL code associated with the particular IC design to reduce the number of low power violations. Still another application may be to identify sub-UPF blocks at different scopes. For example, in FIG. 2, IP3 210 is inside IP4 212, therefore, IP4 212 is in a top level scope with respect to IP3 210 (e.g., IP4 has a higher level scope than IP3 210). If IP4 212 is considered as a whole, the UPF files related to IP3 210 are sub-UPF blocks within a lower level scope.

The combined feature array can be used to identify (to developers) behavior differences in a release of, for example, a low power verification tool. When releasing a software application release or patch update for a static low power verification system, the system may be validated against existing inhouse large designs. This is to identify whether the behavior of the system has changed and to determine whether these behavioral changes are expected. Release-to-release differences may often occur in these larger designs and it is often preferable to validate these with the responsible developers. For example, there could have been a few changes by some developers in software that has caused some unit level testcases to produce results that are different from earlier results. Responsible developers are the ones who have done these changes. However, it may be hard to find which particular change has caused these failures because there are many changes that can go between two releases or patches.

A unit-level test suite can be used to identify the owners and map to a large design's failure, as follows. This can be accomplished by generating all the unit test-case images using both RTL feature arrays and UPF feature arrays (combined RIR-UPF feature arrays). The, the system can check whether any of the RTL code or the UPF settings has undergone a modification in a given time period due to a source-code change-list of a developer. Then, test cases (tc) that have undergone a modification can be extracted and assigned to the relevant developer. For example [tc1, tc2, ..., tcM] can be assigned to user 1, [tc6, tcM, ...] can be assigned to user 2, ... and [tc1, tc6] can be assigned to user N.

Further, a supervised machine learning model can be trained with test-cases (i.e., the combined RIR-UPF feature arrays) as data and user-names as labels. The differences obtained and comparted in operation 318 can be used by a trained machine learning model to provide suggestions to the IC designer. Table V provided below illustrates the combined RIR-UPF feature array for this particular application.

TABLE V (Example Combined RIR-UPF Feature Array)

| Testcase | RIR1 | RIR2 | ... | RIRN | UPF1 | ... | UPFM | Users |
|---|---|---|---|---|---|---|---|---|
| tc1 | 1 | 0 | ... | 1 | 2 | ... | 1 | user1 |
| tc2 | 0 | 2 | ... | 1 | 1 | ... | 0 | user1 |
| tc6 | 2 | 1 | ... | 0 | 1 | ... | 1 | user2 |
| ... | | | | | | | | |
| tcM | 1 | 1 | ... | 2 | 0 | ... | 1 | userN |

After training the machine learning model, each difference can be extracted in the large designs as a combined RIR-UPF feature array that represents the exact file and line number in the RTL code. Then, the combined RIR-UPF feature array can be provided to the machine learning model and so that the machine learning model can predict the output user-names that are responsible for differences in the larger design.

The combined feature arrays can be implemented for clone detection of IC components and for code verification. As describe above, images can be generated from the RTL code. These images can be used for clone detection or code verification may include obtaining a first RTL code, extracting first RTL constructs from the first RTL code, generating a first RTL array from the extracted first RTL constructs, and generating a first RTL image recognition (RIR) image from the generated first RTL array. Color in the first RIR image can correspond to values included in the first array. Further the generated first RIR image can be compared to other RIR images to find a portion of an RIR image that matches at least a portion of the generated first RIR image, and then a determination can be made that the portion of the first RTL code is validated as a result of finding the portion of the RIR image that matches the portion of the generated first RIR image. The above-describe procedures can be implemented to generate the images in the same manner as the generation of the feature arrays and the combined feature arrays.

Figure 4:
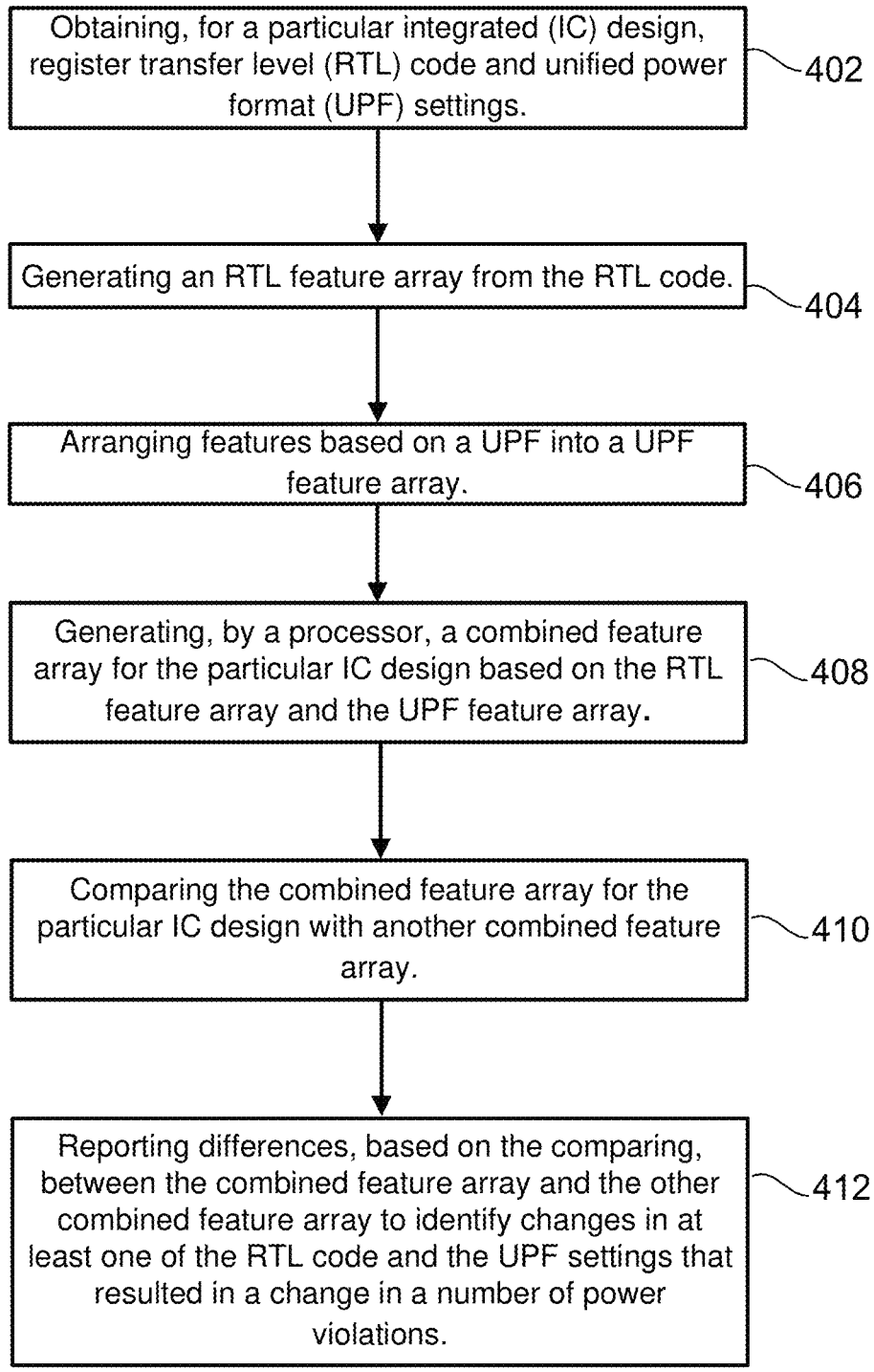
FIG. 4 illustrates a flowchart of various operations to perform the process of RIR and UPF feature generation, according to embodiments of the present disclosure.

FIG. 4 illustrates a flowchart of various operations to perform the process of RIR and UPF feature generation, according to embodiments of the present disclosure. Specifically, the flowchart 400 includes an operation 402 of obtaining, for a particular integrated (IC) design, register transfer level (RTL) code and unified power format (UPF) settings. Further, the flowchart 400 includes an operation 404 of generating an RTL feature array from the RTL code. The operations also include an operation 406 of arranging features based on a UPF into a UPF feature array, an operation 408 of combining, by a processor, the RTL feature array and the UPF feature array go generate a combined feature array for the particular IC design, and an operation 410 of comparing the combined feature array for the particular IC design with another combined feature array. The flowchart 400 also includes an operation 412 of reporting differences, based on the comparing, between the combined feature array and the other combined feature array to identify changes in at least one of the RTL code and the UPF settings that resulted in a change in a number of power violations.

Figure 5:
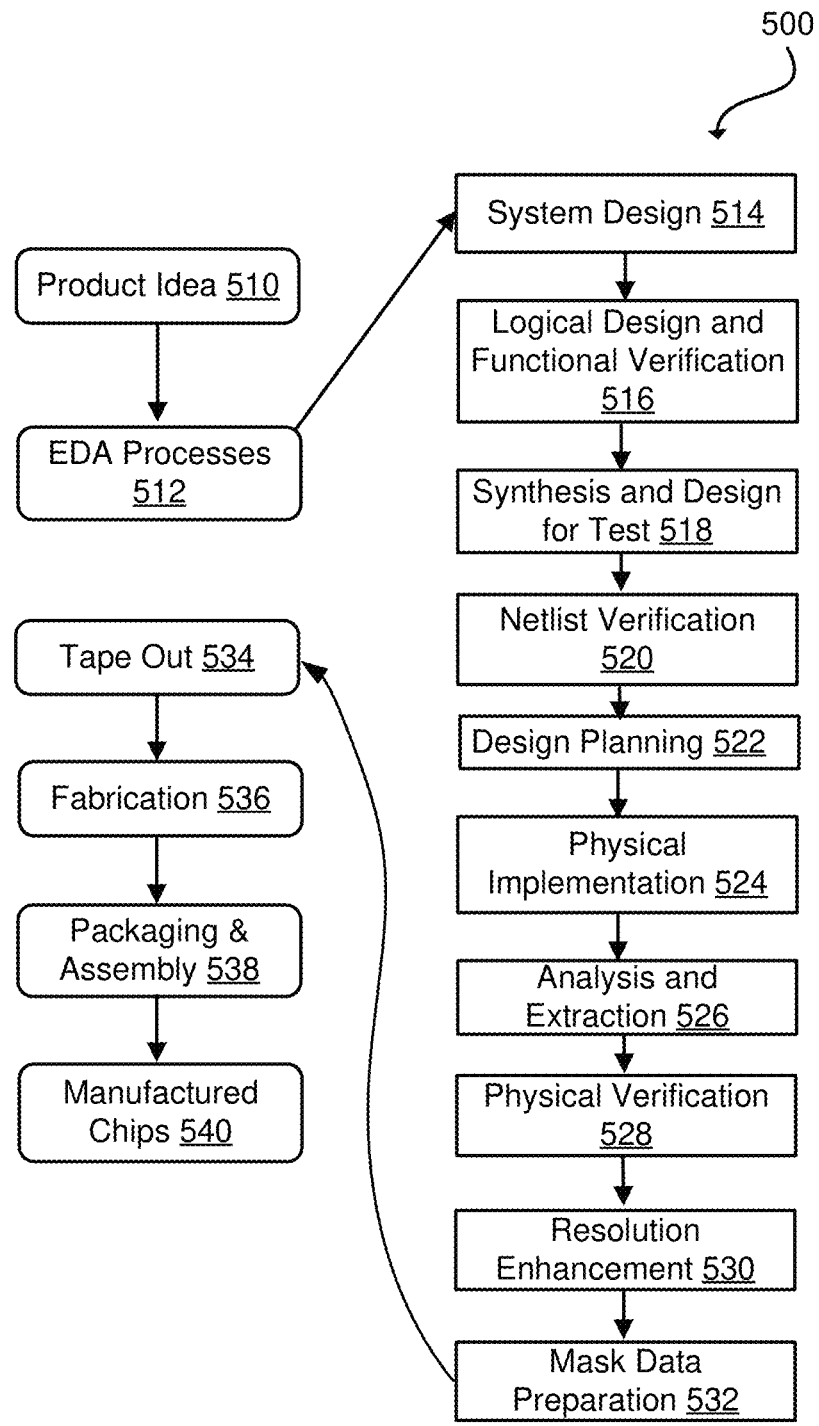
FIG. 5 depicts a flowchart of various processes used during the design and manufacture of an integrated circuit in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. These processes can be used to carry out the low power verification techniques described herein. Each of these processes can be structured and enabled as multiple modules or operations. The term 'EDA' signifies the term 'Electronic Design Automation.' These processes can include implementation of the modification (or optimization) sessions, as described herein. Further, these processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 5. The processes described by be enabled by EDA products (or EDA systems).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 6:
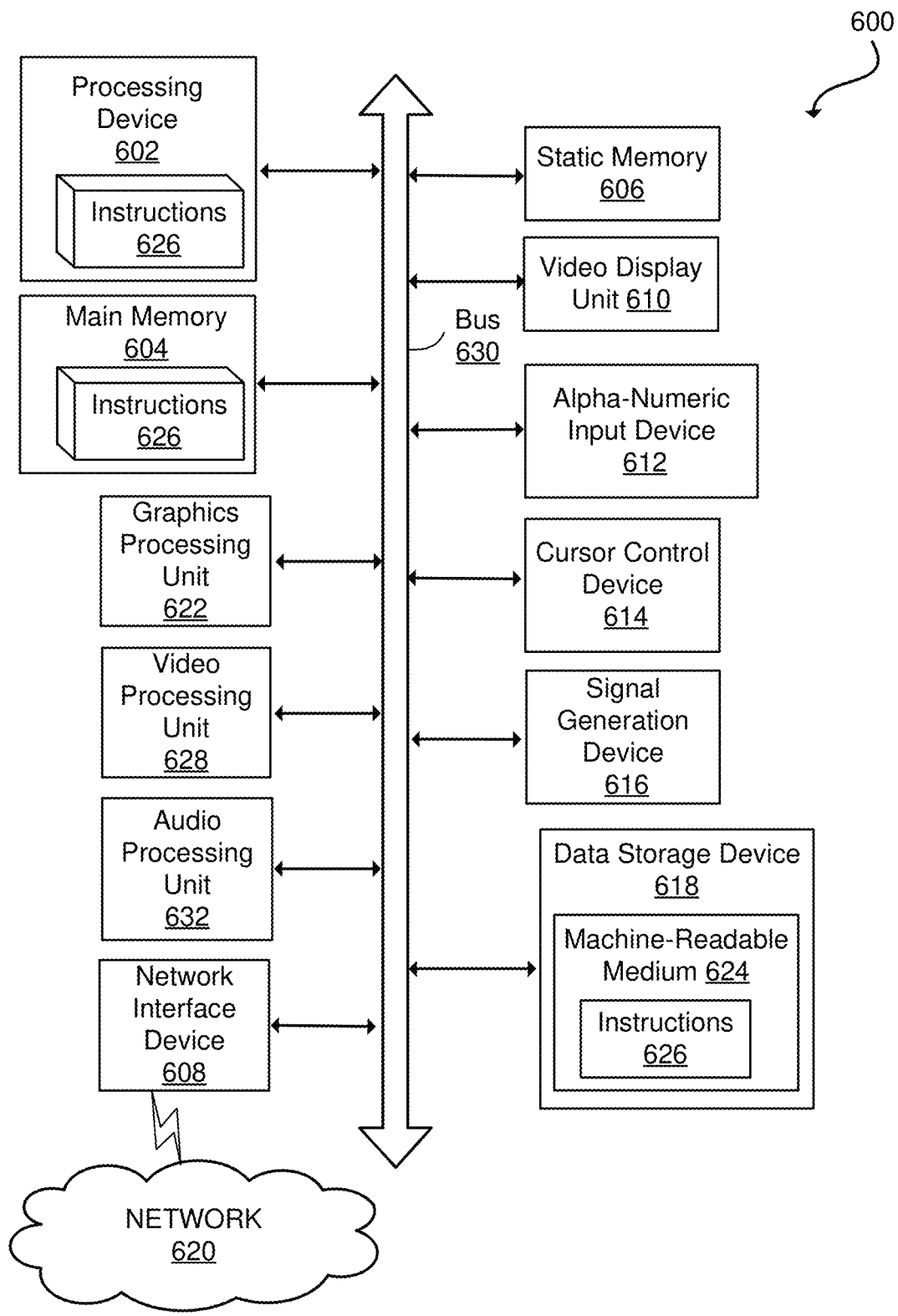
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein including the operations of the modification, verification or optimization sessions, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are expressions used by those skilled in the data processing arts to effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   obtaining, for a particular integrated (IC) design, register transfer level (RTL) code and unified power format (UPF) settings;
   generating an RTL feature array from the RTL code;
   arranging features based on a UPF into a UPF feature array;
   generating, by a processor, a combined feature array for the particular IC design based on the RTL feature array and the UPF feature array;
   comparing the combined feature array for the particular IC design with another combined feature array; and
   reporting differences, based on the comparing, between the combined feature array and the other combined feature array to identify changes in at least one of the RTL code and the UPF settings that resulted in a change in a number of power violations.

2. The method of claim 1,
   wherein the differences are reported to a low power verification tool, and
   wherein the method further comprises, providing suggestions to an IC designer, via the low power verification tool, for modifying at least one of the UPF settings and the RTL code associated with the particular IC design to reduce the number of power violations.

3. The method of claim 2, wherein the suggestions are provided in dependence on a trained machine learning model considering the reported differences and then providing the suggestions based on the reported differences.

4. The method of claim 1, wherein the RTL feature array and the UPF feature array correspond to a same RTL file associated with the particular IC design.

5. The method of claim 1, wherein the RTL feature array is generated from extracted RTL constructs that are extracted from the RTL code.

6. The method of claim 5, wherein the RTL feature array is generated from the extracted RTL constructs by populating the RTL feature array with (i) identified first indexes associated with the RTL constructs and (ii) values assigned to the first indexes, such that there is a particular value assigned to each identified index.

7. The method of claim 1, wherein the arranging of the features into the UPF feature array includes:
   obtaining intermediate data that associates each UPF setting for components of the particular IC design with RTL objects, of the RTL code, identifying the components;
   obtaining UPF feature information related to the UPF settings; and
   combining the intermediate data and the UPF features to form the UPF feature array.

8. The method of claim 7, wherein the obtained feature information includes UPF feature information for each UPF setting identified by the intermated data.

9. The method of claim 7, wherein the obtained UPF feature information includes UPF feature information for UPF settings selected from the UPF settings identified by the intermediate data.

10. The method of claim 7, wherein the UPF feature array is populated with (i) identified feature indexes associated with UPF settings identified in the intermediate data and (ii) values assigned to the feature indexes, such that there is a particular value assigned to each identified feature index.

11. The method of claim 10, wherein a value assigned to a specific feature index corresponds to a name of a particular UPF feature.

12. The method of claim 10, wherein a value assigned to a specific feature index corresponds to a value of a characteristic of a particular UPF feature.

13. The method of claim 10, wherein the intermediate data identifies low power verification violations within the RTL code in association with UPF settings.

14. The method of claim 1, wherein the combined feature array for the particular IC design is populated with (i) identified feature indexes associated with both RTL constructs and UPF settings identified in intermediate data that associates each UPF setting for components of the particular IC design with RTL objects, of the RTL code, identifying the components and (ii) values assigned to the feature indexes, such that there is a particular value assigned to each identified feature index.

15. A non-transitory computer readable storage medium comprising stored instructions, which when executed by a processor, cause the processor to perform operations comprising:
obtaining, for a particular integrated (IC) design, register transfer level (RTL) code and unified power format (UPF) settings;
generating an RTL feature array from the RTL code;
arranging features based on a UPF into a UPF feature array;
generating, by a processor, a combined feature array for the particular IC design by combining the RTL feature array and the UPF feature array;
comparing the combined feature array for the particular IC design with another combined feature array; and
reporting differences, based on the comparing, between the combined feature array and the other combined feature array to identify changes in at least one of the RTL code and the UPF settings that resulted in a change in a number of power violations.

16. The non-transitory computer-readable recording medium of claim 15, wherein the operations further comprise training a machine learning model using the combined feature array and another combined feature array.

17. The non-transitory computer-readable recording medium of claim 16, wherein the operations further comprise implementing the trained machine learning model to provide suggestions to an IC designer for modifying at least one of the UPF settings and the RTL code associated with the particular IC design.

18. A system comprising:
a memory storing instructions; and
a processor, coupled with the memory and to execute the instructions, the instructions when executed cause the processor to perform operations comprising:
obtaining, for a particular integrated (IC) design, register transfer level (RTL) code and unified power format (UPF) settings;
generating an RTL feature array from the RTL code;
arranging features based on a UPF into a UPF feature array;
generating, by a processor, a combined feature array for the particular IC design by combining the RTL feature array and the UPF feature array;
comparing the combined feature array for the particular IC design with another combined feature array; and
reporting differences, based on the comparing, between the combined feature array and the other combined feature array to identify changes in at least one of the RTL code and the UPF settings that resulted in a change in a number of power violations.

19. The system of claim 18, wherein the operations further comprise performing a set of modifications to at least one of the UPF settings and the RTL code, based on the comparing, to generate a modified IC design.

20. The system of claim 18, wherein the operations further comprising identifying behavior differences in two different releases of a low power verification tool by comparing differences between (i) the combined feature array generated, in part, from information provided by a one release of the low power verification tool and (ii) the other combined feature array generated, in part, from information provided by another release of the low power verification tool.

* * * * *